United States Patent [19]

Fish

[11] 4,052,611
[45] Oct. 4, 1977

[54] HIGH SPEED FIBER OPTIC COMMUNICATION LINK

[75] Inventor: Franklin H. Fish, Indianapolis, Ind.

[73] Assignee: The United States of America as represented by the Secretary of the Navy, Washington, D.C.

[21] Appl. No.: 570,927

[22] Filed: Apr. 22, 1975

[51] Int. Cl.² .............................................. H04B 9/00
[52] U.S. Cl. .................................... 250/199; 178/68; 325/38 R
[58] Field of Search .................. 250/199; 178/DIG. 2, 178/68; 307/242, 236, 262; 325/141, 40, 38 R

[56] References Cited

U.S. PATENT DOCUMENTS

| | | | |
|---|---|---|---|
| 3,222,547 | 12/1965 | Boan et al. | 307/262 |
| 3,389,341 | 6/1968 | Thomas | 250/199 |
| 3,486,029 | 12/1969 | Barrett et al. | 250/199 |
| 3,488,586 | 1/1970 | Watrous et al. | 250/199 |
| 3,790,791 | 2/1974 | Anderson | 250/227 |
| 3,801,819 | 4/1974 | Ohnsorge | 250/199 |

Primary Examiner—Robert L. Griffin
Assistant Examiner—Marc E. Bookbinder
Attorney, Agent, or Firm—R. S. Sciascia; Paul S. Collignon

[57] ABSTRACT

A high speed fiber optic communication link having a differential transmitter circuit for receiving digital data and providing a first output for transmitting a signal representing a logic "one" and a second output for transmitting a signal representing a logic "zero". First and second light emitting diodes are provided for converting the electrical signals into light signals. These light signals are transmitted by optical waveguides to first and second light detecting diodes which convert the light signals back into electrical signals. These converted electrical signals are then amplified by a differential receiver circuit.

8 Claims, 4 Drawing Figures

HIGH SPEED FIBER OPTIC COMMUNICATION LINK

BACKGROUND OF THE INVENTION

The present invention relates to a fiber optic communication link, and more particularly to a short length, very high data rate, communication link.

One problem in transmitting information through standard electrical cables is the undesirable effect of radiated and conducted EMI (electro-magnetic interference) normally associated with these cables. Such EMI may, for example, cause spurious or other erroneous readings from equipment attached to the cable. One solution to this problem has been to convert the information to be transmitted from electrical energy to light energy, transmit the light energy signal through a light conducting cable such as, for example, a fiber optic bundle, and reconvert the light energy into electrical energy at the receiving end. Since the light conducting cable is not responsive to EMI, interference on the line is thus eliminated.

Fiber optic technology is being considered for future applications in two distinct areas of the data communication field. The first of these application areas, which is presently under intensive development, is concerned with the transmission of data over medium to long distances. Long distance data transmission utilizes low loss optical fiber, avalanche photodiode detectors with special low noise preamplifiers and bias stabilization circuits, thermoelectrically cooled laser diodes, and periodic repeater stages. Because of the potentially large commercial application for long distance optical data transmission, much privately sponsored research is directed towards this area. Medium and long distance optical communication links are also of considerable interest to the military departments.

The second area of development is concerned with the optical transmission of data over short distances of a few hundred meters or less. The advantages to be gained over the use of conventional wire cables include: higher per channel data rate capability, immunity to electromagnetic interference, lower cable weight, elimination of fire hazard due to electrical shorting, and potentially lower cost. For short length data link applications, multi-fiber bundles of medium and high loss fiber are utilized. Light emitting diodes (LED's) are employed as optical sources, and photodiodes are used for optical detection. Short distance optical data transmission is of particular interest to the military departments since this technology has been proposed for the optical wiring of aircraft where line lengths of 150 feet or less are encountered.

Heretofore available existing equipment lack DC coupling and do not provide high data rate capability for high performance applications. Also the circuits are excessively complex, require numerous, non-standard power supply voltages and are suitable only for room temperature, non-military applications.

SUMMARY OF THE INVENTION

The present invention relates to a communication link and more particularly to a communication link for transmitting and receiving digital data at a high rate through fiber optic cables. The digital signal to be transmitted is applied to a data input terminal of a differential transmitter circuit which provides one output for a logic "one" and a second output for a logic "zero". First and second light emitting diodes convert the output signals from the differential transmitter circuit into light signals which are then transmitted to a desired location by fiber optic cables. A pair of photodiodes are used to detect the optical radiation out of the fiber optic cables. A receiver circuit is provided to amplify the very low output from the photodiodes to an emitter coupled logic voltage and power level.

It is therefore a general object of the present invenion to provide a high speed fiber optic communication link for transmitting and receiving digital data.

Other objects, advantages, and novel features of the present invention will become apparent from the following detailed description of the invention when considered in conjunction with the accompanying drawings.

DESCRIPTION OF THE PREFERRED EMBODIMENT

Figure 1:
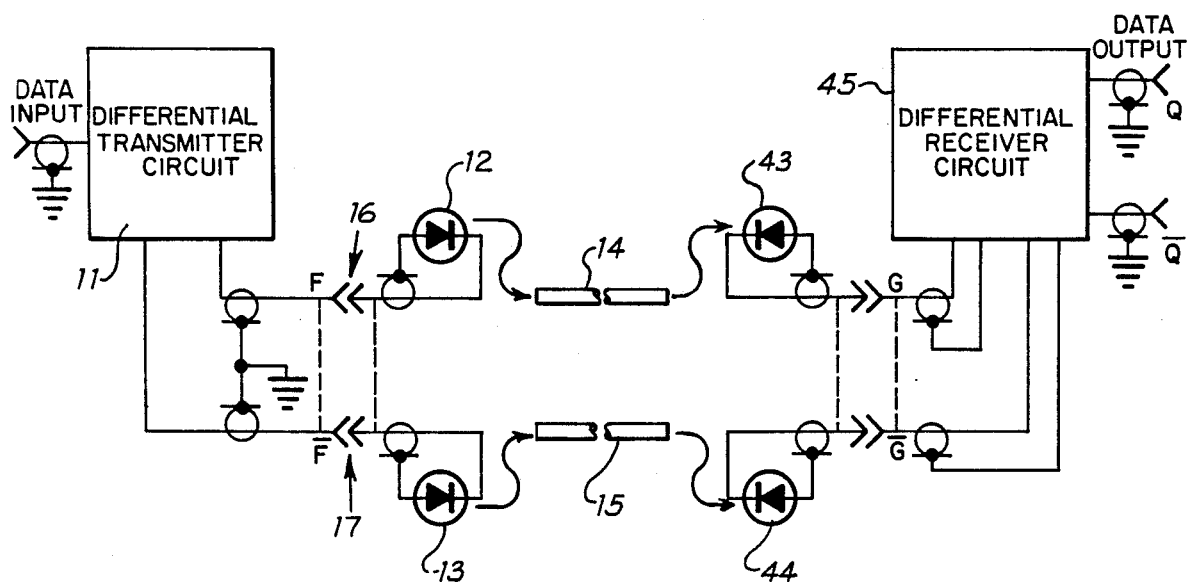
FIG. 1 is a diagrammatic view of a preferred embodiment of the present invention.

Referring now to FIG. 1 of the drawings, a digital signal to be transmitted is applied to the data input terminal of a differential transmitter circuit 11. The circuit operates from standard emitter coupled logic (ECL) levels of $-0.8$ volts and $-1.6$ volts, nominally. An input logic "one"($-0.8$ volts) to differential transmitter circuit 11 results in a current being applied to a light emitting diode 12, and no signal being applied to light emitting diode 13. Conversely, an input logic "zero"($-1.6$ volts) causes an input current to be applied to diode 13, only. The logical operation of the differential transmitter circuit is summarized in TABLE I.

TABLE I

| INPUT TO DIFFERENTIAL TRANSMITTER CIRCUIT 11 | OUTS FROM DIFFERENTIAL TRANSMITTER CIRCUIT 11 | |
|---|---|---|
| | F | F̄ |
| 0 | NO SIGNAL | CURRENT "I" |
| 1 | CURRENT "I" | NO SIGNAL |

Figure 2:
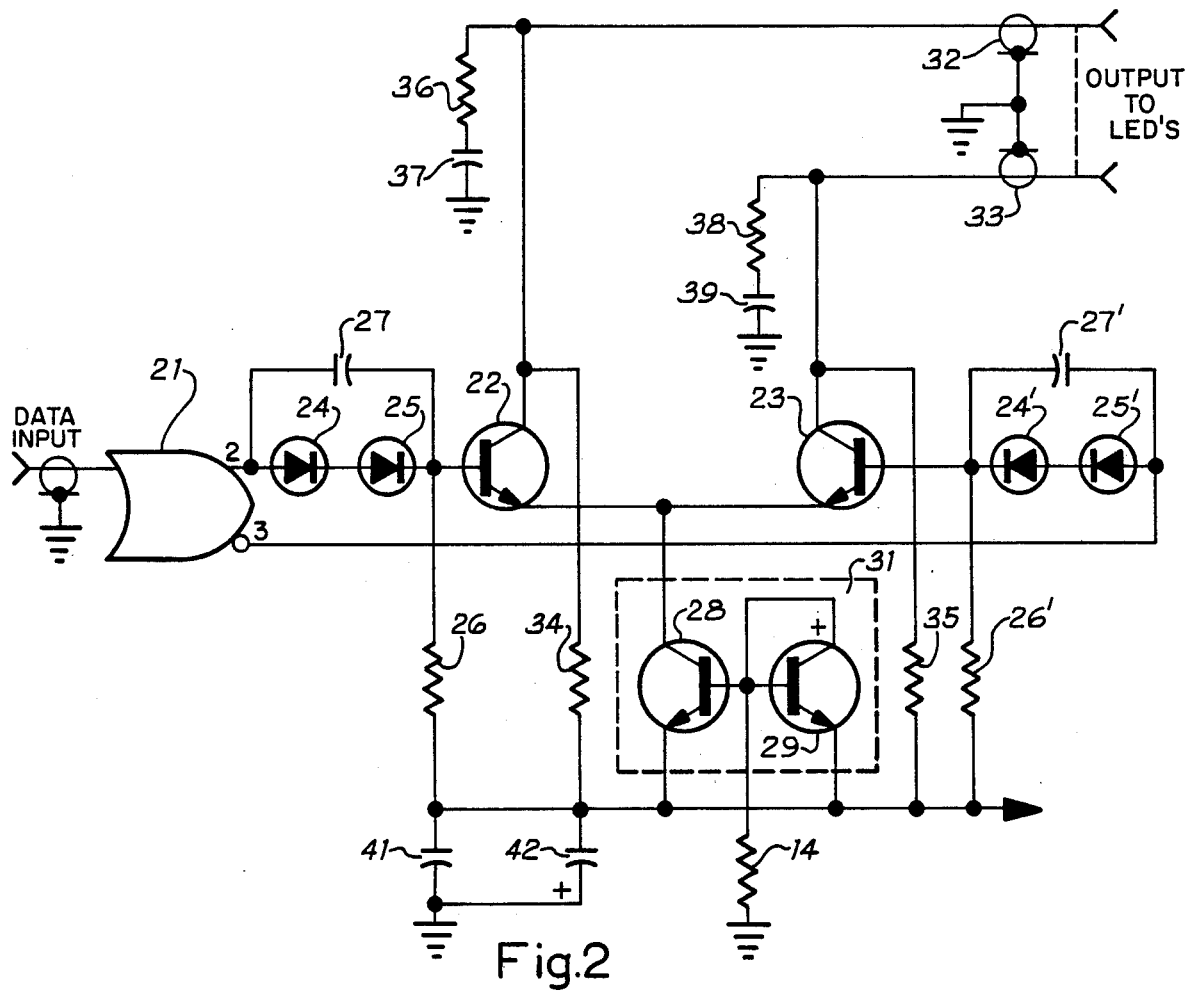
FIG. 2 is a schematic diagram of a differential transmitter circuit.

The drive current level "I" is determined by the value of an application selectable resistor 14 in the differential transmitter circuit shown in FIG. 2 of the drawings. When operated in the forward conduction region, light emitting diodes 12 and 13 each have a current versus "light" power output transfer function which is nearly linear. The output "light" signal is, therefore, a linear analog of the diode current drive. The percentage of the total "light" power output which is coupled into a fiber bundle is a critical design parameter. Optimum source-to-fiber coupling depends on numerous factors such as: the numeric aperture (N.A.) of the fiber; fiber end finish and polish; the core-to-cladding ratio; fiber packing factor; the source-to-fiber spacing; mechanical alignment; use of optical index matching films, fill materials, and windows; use of lens systems or reflective optics to collimate the radiation pattern; and other similar factors. This invention utilizes a LED-connector configuration which is optimized for coupling to medium loss fiber. Total coupling loss from the package LED to the fiber is approximately 3 db. The diode light power output at 50 mA drive current level is 1.0 mWatts; so, 0.5 mWatts of optical power is coupled into the medium loss fiber. The absorption and scattering losses internal to the fiber are less that 0.2 db/foot for presently available, low cost fiber.

Referring again to FIG. 1 of the drawings, a fiber optic cable 14 and diode 12 are connected to differential transmitter circuit 11 by a fiber optic connector 16 and fiber optic cable 15 and diode 13 are connected in a similar manner to differential transmitter circuit 11 by connector 17. By way of example, connectors 16 and 17 might be of the type shown and described in U.S. Pat. No. 3,790,791, entitled, "Optoelectronic Cable Assembly", which issued Feb. 7, 1974, to Norman Richard Anderson. In this patented cable assembly, standard connector elements are utilized as part of the termination assemblies. Mounted in each termination assembly are a plurality of termination elements each of which is adapted to have a fiber optic light conducting cable secured therein. An active optoelectronic device is mounted in a suitable mounting means in each of the termination elements and contact means are attached at one end through the mounting means to make electrical contact with the active device. The contacts project at the other end for connection to external elements. The mounting means is supported by a suitable means in the bore of the element body. A lens or other suitable device is mounted in front of the device for transmitting light between the device and the cable. The assembly design, particularly that for the termination assembly containing a light emitting device, is specially designed for dissipating heat from the device.

Referring now to FIG. 2 of the drawings, the digital data input is applied directly to the input of an ECL gate 21. By way of example a Motorola, MECL III, MC1660S, OR/NOR gate can be utilized; however, there are any number of similar devices marketed by various manufacturers which will operate equally well in this application. The very high speed capability of the ECL gate insures that the signals at output pins 2 and 3 will be no more that 0.2 nsec. out of time coincidence. Propagation delay through the gate is 2 nsec. maximum.

Transistors 22 and 23 form a complementary, current-mode inverter circuit which is driven differentially by the gate output signals. The DC bias voltages at the bases of the current-mode transistors are established by use of diode-resistor networks. The gate output signals swing from −0.8 volts to −1.6 vlots. There is an additional 1.2 volts across the series combination of diodes 24 and 25. The base of transistor 22 switches around nominal levels of −2.0 volts to −2.8 volts. Resistor 26 completes the bias network DC path as well as providing the additional loading required for high speed operation of the gate. Capacitor 27 is a high frequency by-pass for diodes 24 and 25. An identical network is utilized to drive the base of transistor 23. The common emitter voltage of transistors 22 and 23 is approximately −2.6 volts. Since the circuit operates from a negative 5.2 volt supply, there is an additional 2.6 vlots available for operation of the current source comprised of transistors 28 and 29. This voltage is more than sufficient for operation of the current mirror configuration utilized. Transistors 28 and 29 are matched devices packaged in the enclosure 31 for thermal integration. The operation of the current mirror is such that the current level established in transistor 29 by resistor 14 will cause a nearly identical current to flow in transistor 28. The current level is set at approximately 50 mA by resistor 14, which establishes the LED current drive level.

The anodes of two GaAs diodes 12 and 13 are connected to ground potential, and the cathodes are connected to the respective collectors of the complementary, current-mode inverter. Depending on the logic state of integrated circuit 21, either transistor 22 or transistor 23 will be on and conduct the current established by the current source. If pin 2 is at −0.8 volts, then −2.0 volts will appear at the base of transistor 22, and the base of transistor 23 will be at −2.8 volts. Under these operating conditions transistor 22 will conduct and transistor 23 will be "off". The "on" transistor will always be out of saturation since the base voltage is never more than −2.0 volts and the nominal drop across the LED is 1.5 and 1.6 volts. The circuit is symmetrical so operation to a logic zero input is identical with transistor 23 conducting and transistor 22 "off".

Transistors 22 and 23 are specially designed devices for use in fast, current-mode, switching circuits. The typical gain-bandwidth product at a 50 mA collector current level is 2.0 GHz. Output current pulse rise-times and fall-times are measured to be slightly more than 2 nsecs., and the two output current pulses are in nearly perfect time coincidence.

Resistors 34 and 35 pre-bias the LED's to a 1 mA current level in order to minimize turn-on time delay. The resistor-capacitor collector network (resistor 36-capacitor 37 and resistor 38-capacitor 39) insure stability of the current mode circuitry under the anticipatd loading conditions. Capacitors 41 and 42 are power supply by-pass filters.

Referring again to FIG. 1 of the drawings, and also to TABLE I, a light signal which is an exact logic replica of the input data signal is transmitted down fiber optic cable 14 and the logic complement of this signal is transmitted by fiber optic cable 15. Photodiodes 43 and 44 convert the light signals to corresponding currents. Thus signal G equals signal F and signal $\overline{G}$ equals $\overline{F}$. The function of differential receiver circuit 45 is to amplify the very low power input signal to an ECL voltage and power level. Output signal Q from the differential receiver circuit 45 is logically equivalent to input current signal G and $\overline{Q}$ is equivalent to $\overline{G}$.

Figure 3:
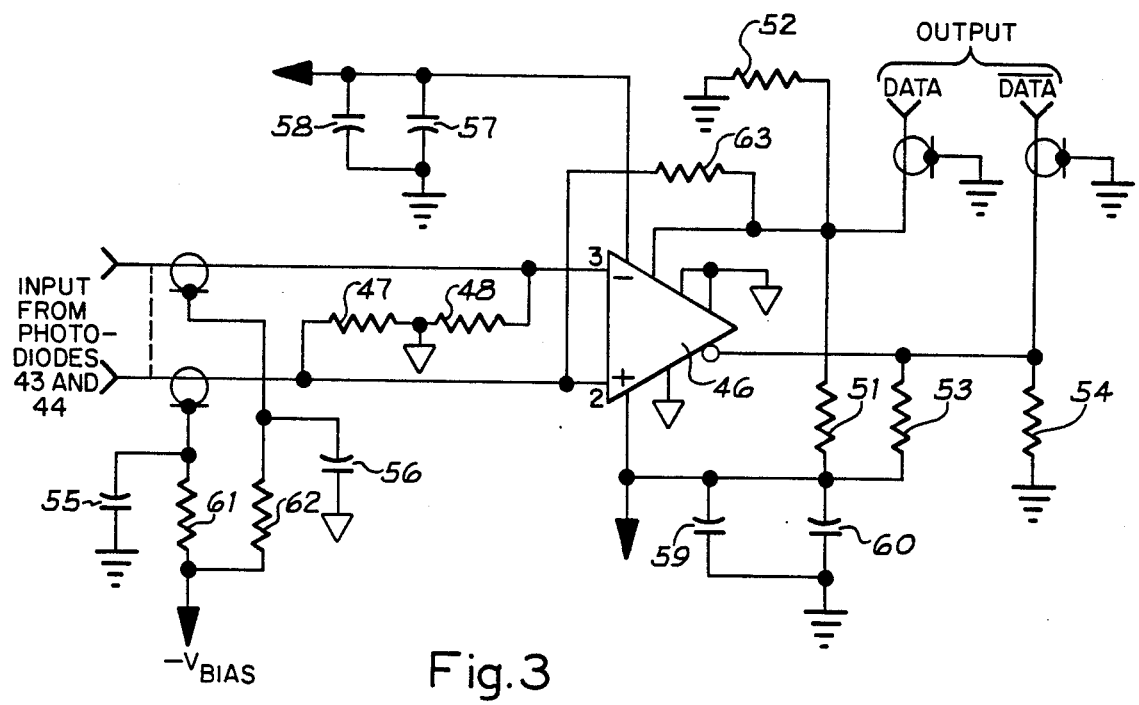
FIG. 3 is a schematic diagram of a differential receiver circuit.

Referring now to FIG. 3 of the drawings, which shows, in detail, differential receiver circuit 45, an ECL voltage comparator 46 is utilized as the active gain element. By way of example, voltage comparator 46 might be of the type manufactured by Advanced Micro Devices under the designation "AM 685". The "AM 685" voltage comparator is unique in that it exhibits both very high speed of operation and high gain sensitivity; in other respects, its operation is essentially the same as any conventional analog comparator. The circuit responds to the differential input voltage between pins 2 and 3. The minimum voltage gain is 6000 so input sensitivity is a fraction of a millivolt. An input overdrive level of 5 mVolts is specified in order to guarantee maximum speed of response.

Photodiodes 43 and 44 are terminated in resistive loads 47 and 48. The selection of the terminating resistor value determines the maximum operating frequency as well as the maximum allowable optical fiber length.

The terminating resistors can be selected for optimum performance in a particular application, if required.

The receiver as shown in FIG. 3 of the drawings is implemented with DC coupling. The error source which limit the sensitivity of the receiver are comparator input offset voltage error, comparator input offset current error, photodiode dark current leakage, and AC and DC matching of input resistors.

Voltage comparator 46 has logic true and complement outputs. The output stage is an emitter follower which is configured to provide standard ECL logic levels when driving a 50Ω resistor connected to −2.0 volts. An alternate biasing scheme is utilized for the invention so as to not require an additional −2.0 volt power supply. The biasing networks are comprised of resistors 51, 52, 53, and 54, which derive the necessary bias voltage levels from the −5.2 volts supply, and also satisy the 50Ω source impedance requirement.

Power supply decoupling is provided by capacitors 55, 56, 57, 58, 59, and 60, and by resistors 61 and 62. resistor 63 provides positive feedback which results in a few tenths of a millivolt hystersis. This hystersis prevents the comparator from oscillating under no-signal conditions.

OPERATION

Figure 4:
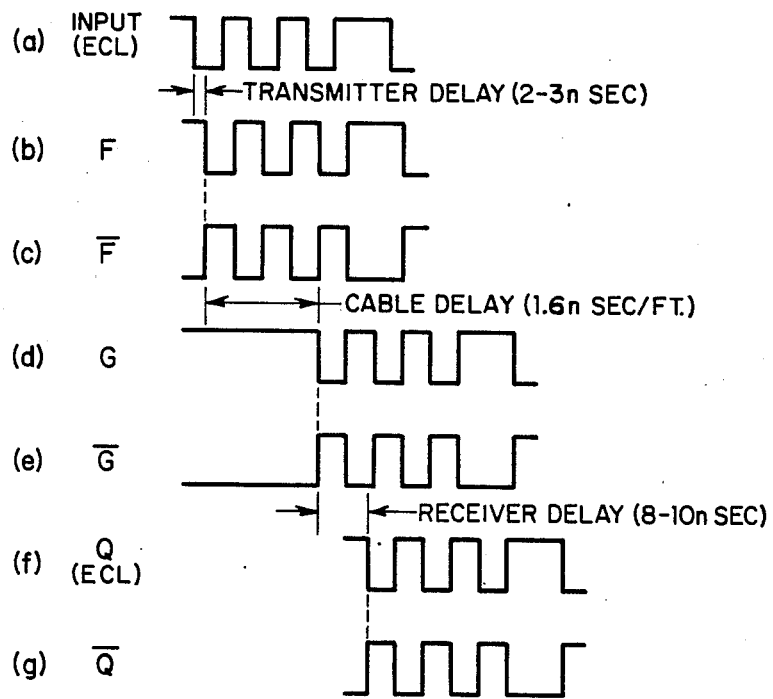
FIG. 4 is a diagram showing typical wave shapes produced by the embodiment shown in FIG. 1 of the drawings.

In operation, a digital signal, such as shown in FIG. 4(a) of the drawings, is applied to a data input terminal of differential transmitter 11. An input logic "one" (−0.8 volts) results in a current being applied to light emitting diode 12 and an input logic "zero" causes an input current to be applied to diode 13. A fiber optic cable 14 is connected with diode 12 by a connector 16 and light from diode 12 is transmitted to a silicon photodiode 43. Likewise, light from diode 13 is transmitted through fiber optic cable 15 to photodiode 44.

As shown in FIGS 4(b) and 4(c) of the drawings, a light signal "F", which is an exact logic replica of the input data signal is transmitted by fiber optic cable 14 and the logic complement of this signal, "F̄", is transmitted by fiber optic cable 15. Photodiodes 43 and 44 convert the light signals to corresponding currents. Thus, signal F equals signal G and signal F̄ equals signal Ḡ. As shown in FIGS. 4(d) and 4(e), signals G and Ḡ have a propagation delay of 1.8 nsec/foot of cable and, as it is important that the two received signals be nearly in exact time coincidence, fiber optic cables 14 and 15 must be carefully matched in length to insure that the two light signals arrive at receiver 45 simultaneously.

The function of receiver 45 is to amplify the very low power input signals to ECL voltage and power levels. As shown in FIGS. 4(f) and 4(g), output signal Q is logically equivalent to input current signal G and output signal Q̄ is logically equivalent to input current signal Ḡ.

It can thus be seen that the present invention provides a communication link which can transmit digitized information at a very high data rate. For example, data rate of DC to in excess of 100 MBITS/sec can be achieved with a circuit configuration which is capable of reliable operation in a military environment.

Obviously many modifications and variations of the present invention are possible in the light of the above teachings. It is therefore to be understood that within the scope of the appended claims the invention may be practiced otherwise than as specifically described.

I claim:

1. A high speed fiber optic communication link comprising,
   a differential transmitter circuit having first and second output terminals and having a single input terminal for receiving digital data and having logic means for providing output digital data on said first and second output terminals representing logic "one" and logic "zero" electrical signals, said output data representing a logic "one" signal being an output signal level on said first output terminal only and said output data representing a logic "zero" signal being an output signal level on said second output terminal only,
   first and second electro-optic devices connected with said first and second output terminals, respectively, for converting said logic "one" and logic "zero" electrical signals to light signals,
   first and second optical waveguides for transmitting said light signals to another location,
   first and second photo-detectors at said another location connected with said first and second optical waveguides for converting said light signals to electrical signals, and
   a differential receiver circuit having first and second inputs connected one each with the outputs of said first and second photo-detectors for amplifying and combining said converted electrical signals into digital data corresponding to the digital data applied to the differential transmitter circuit.

2. A high speed fiber optic communication link as set forth in claim 1 wherein said first and second electro-optic devices are light emitting diodes.

3. A high speed fiber optic communication link as set forth in claim 1 wherein said first and second photo-detectors are photo diodes.

4. A high speed fiber optic communication link as set forth in claim 1 wherein said first and second optical waveguides are first and second fiber optic cables.

5. A high speed fiber optic communication link as set forth in claim 4 wherein said first and second fiber optic cables are matched in length.

6. A high speed fiber optic communication link as set forth in claim 4 wherein said first and second fiber optic cables are connected with said first and second output terminals of said differential transmitter circuit through first and second connectors and said first and second electro-optic devices are light emitting diodes positioned one each in said connectors.

7. A high speed fiber optic communication link as set forth in claim 4 wherein said first and second fiber optic cables are connected one each to said first and second inputs of said differential receiver circuit through first and second connectors and said first and second photo-detectors are photo diodes positioned one each in said connectors.

8. A high speed fiber optic communication link comprising,
   a differential transmitter circuit having first and second output terminals and having a single input terminal for receiving digital data and having logic means
   first and second light emitting diodes connected with said first and second output terminals, respectively, for converting said logic "one" and logic "zero" electrical signals to light signals,
   first and second fiber optic cables of equal length for transmitting said light signals to another location, first and second photo diodes at said another location connected with said first and second fiber optic cables for converting said light signals to electrical signals, and a differential receiver circuit having first and second inputs connected one each with the outputs of said first and second photodiodes for amplifying and combining said converted electrical signals into digital data corresponding to the digital data applied to the differential transmitter circuit.

* * * * *

UNITED STATES PATENT OFFICE
CERTIFICATE OF CORRECTION

PATENT NO. : 4,052,611
DATED : October 4, 1977
INVENTOR(S) : FRANKLIN H. FISH

It is certified that error appears in the above-identified patent and that said Letters Patent are hereby corrected as shown below:

Claim 8, column 6, line 62, of the patent, after "means" insert -- for providing output digital data on said first and second output terminals representing logic "one" and logic "zero" electrical signals, said output data representing a logic "one" signal being an output signal level on said first output terminal only and said output data representing a logic "zero" signal being an output signal level on said second output terminal only --

Signed and Sealed this

Seventh Day of February 1978

[SEAL]

Attest:

RUTH C. MASON
Attesting Officer

LUTRELLE F. PARKER
Acting Commissioner of Patents and Trademarks